Nov. 2, 1971   Z. C. BRAND   3,616,699
GIMBAL ZONE TRANSFER APPARATUS

Filed Sept. 29, 1969   7 Sheets-Sheet 1

INVENTOR.
ZAY C. BRAND

BY Edward Dugas
ATTORNEY

Nov. 2, 1971 Z. C. BRAND 3,616,699
GIMBAL ZONE TRANSFER APPARATUS
Filed Sept. 29, 1969 7 Sheets-Sheet 2

INVENTOR.
ZAY C. BRAND

BY *Edward Dugas*
ATTORNEY

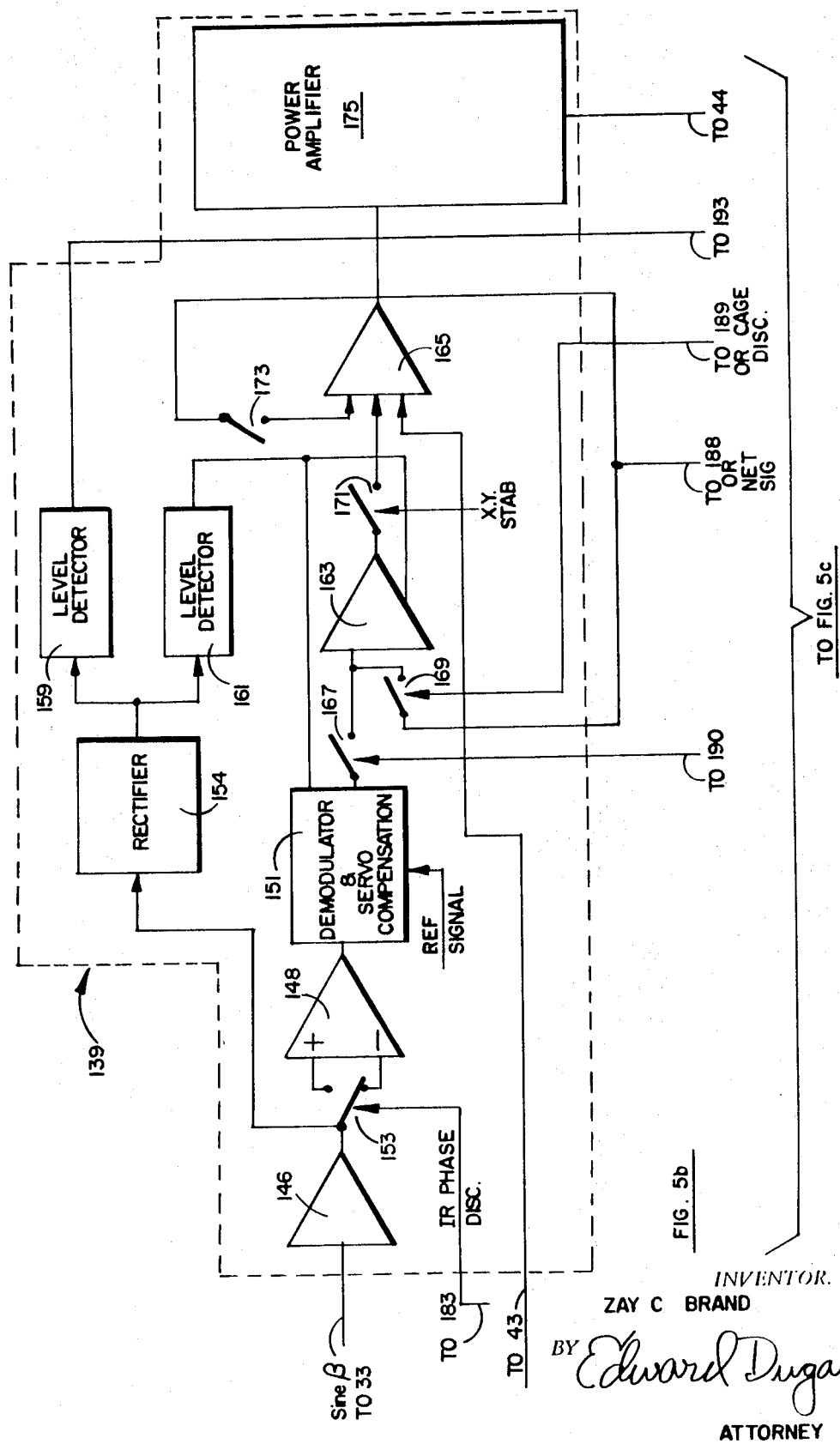

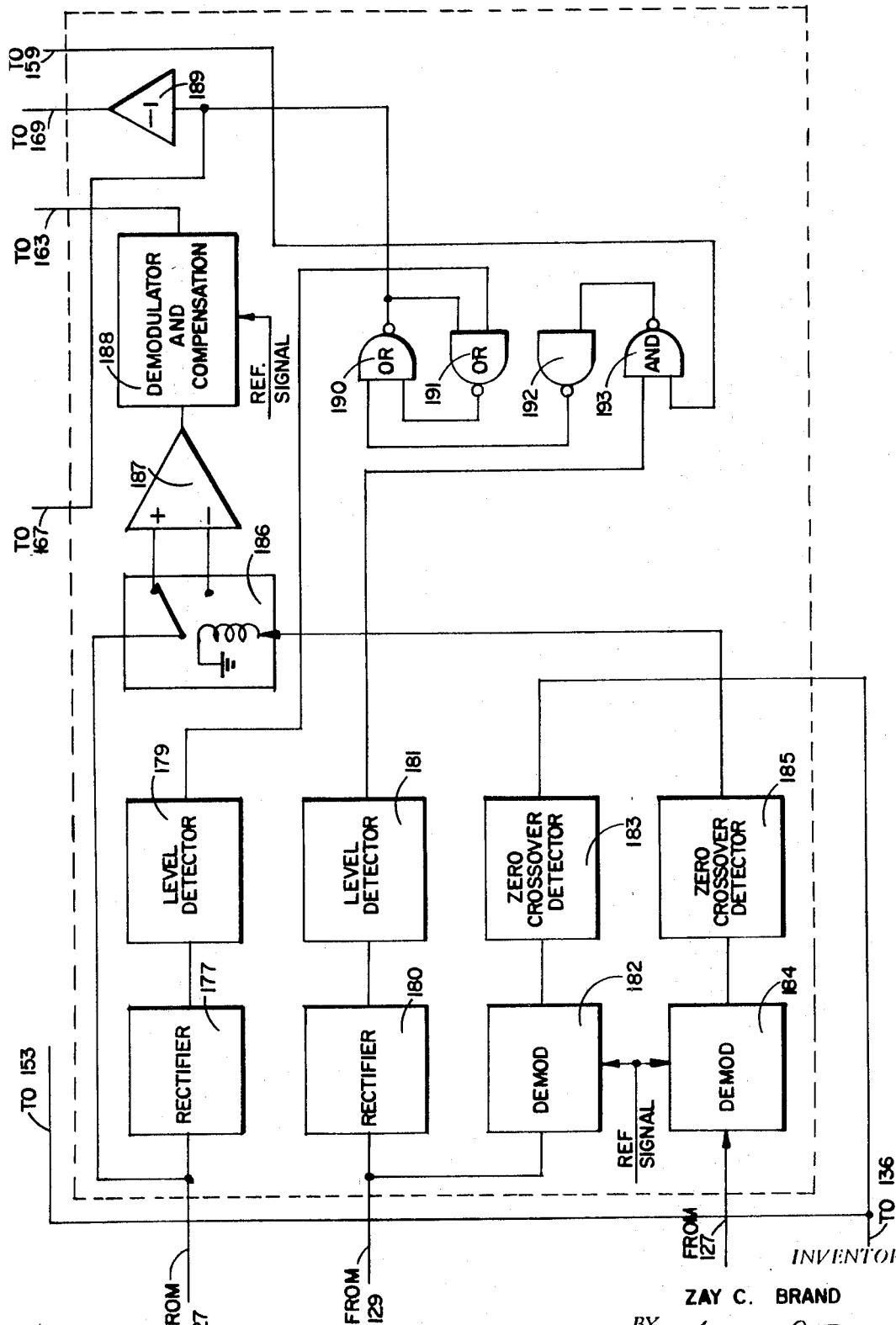

Nov. 2, 1971  Z. C. BRAND  3,616,699

GIMBAL ZONE TRANSFER APPARATUS

Filed Sept. 29, 1969  7 Sheets-Sheet 7

INVENTOR.
ZAY C. BRAND

BY Edward Dugas

ATTORNEY

United States Patent Office 3,616,699
Patented Nov. 2, 1971

3,616,699
GIMBAL ZONE TRANSFER APPARATUS
Zay C. Brand, Seal Beach, Calif., assignor to
North American Rockwell Corporation
Filed Sept. 29, 1969, Ser. No. 861,741
Int. Cl. G01c 19/28
U.S. Cl. 74—5.2                                    7 Claims

ABSTRACT OF THE DISCLOSURE

A follow-up control system for a three gimbal four axis inertial platform which utilizes Euler angle logic and electronic sign changing to avoid gimbal flipping when the vehicle on which the platform system is mounted is maneuvering at or near the pitch 90° attitude with a limited amount of roll attitude and which allows gimbal flipping when the aircraft pitches with an amount of roll that allows satisfactory dynamic control of the gimbal.

BACKGROUND OF THE INVENTION

This invention is directed to a mechanization for a stable element which allows a vehicle to pitch at high rates without causing serious mechanical injury to the stable element or upsetting the stable element to the point where it dumps and fails to provide reference information.

In the field of navigational aids for airplanes, utilization of gyroscope assemblies and gimbals to provide a stabilized platform for inertial elements is well known. In the past, it was conventional to have a gimbal system with three degrees of angular freedom. Using a set of gimbals which has three degrees of angular freedom presented a serious problem in that there are certain attitudes of the inertial platform relative to the supporting vehicle which causes two or more gimbals to align themselves in such a way as to cause one of the degrees of angular freedom to be lost. This situation is known as "gimbal lock," and is highly undesirable in that with only two degrees of angular freedom among the sets of gimbals, the operability of the gyroscopes and gimbals become seriously impaired. One prior art patent, U.S. Pat. No. 3,029,646, entitled "Gimbal Support for a Stable Element," by J. M. Slater et al., attacks this particular problem by providing an additional gimbal and means for driving the additional gimbal to cause the axis of rotation of the remaining gimbals to be maintained substantially at right angles to each other to cause the stable element to have universal freedom of angular freedom at all times. One of the problems associated with the particular configuration shown in that patent is that for high rates of pitch, there is almost an instantaneous demand upon the motor driving the gimbal to be flipped, which demand, due to practical reasons, cannot be fulfilled. The problem may be explained by taking an example of an inertial platform whose sequence of axes from the stable element to the vehicle is azimuth, inner roll, pitch, and outer roll. All axes have complete angular freedom except inner roll. The outer roll gimbal is normally controlled by pickoff between the inner roll and pitch gimbal so as to maintain orthogonality between the platform azimuth and pitch axes.

In the case where the vehicle pitches 90 degrees, the outer roll and azimuth axes are coincident and the inner roll senses vehicle yaw. As the vehicle passes through pitch 90 degrees, the servo relationship between the inner roll pickoff and outer roll torquer are such that a 180 degree rotation is demanded of the outer roll gimbal. This is called "gimbal flip." During the gimbal flip, the inner roll axis becomes aligned with pitch and finally again with vehicle yaw. The flip demand is instantaneous, but the dynamic practicality, and the need to control the flip, requires that there is a finite time for the completion of the flip. If a vehicle pitching rate exists, a deviation of pitch attitude from zenith will be created during the time required to complete the flip. This deviation of pitch attitude will couple into the limited degree of freedom inner roll axis. In actuality, the problem of the platform dumping by exceeding the inner roll axis angular freedom is most pronounced by the overshoot of the gimbal flip. This means that the angular pitch deviation from zenith or nadir, coupled into inner roll as the sine of the outer roll overshoot angle, could be larger than that of the 90 degree point of the flip where inner roll would be aligned with vehicle pitch. Increased vehicle pitch rate will cause an increase of the angle coupled into inner roll at the time of peak overshoot so that at a specific vehicle pitch rate the platform will tumble. It is not practical to simply increase the torque to inertia ratio of the outer roll torquer and gimbal to reduce the time taken to flip, in that pitching rate capability increases approximately as the square root of torque capability and the problem area centers about the damping of the flipped gimbal as well as structure size. It would, therefore, be highly desirable to have a mechanization which modifies the need to gimbal flip at the zenith or nadir and thus increases the pitching rate capability of the vehicle.

SUMMARY OF THE INVENTION

In the preferred embodiment of the invention, an inertially stabilized element is mounted to a vehicle by means of a first gimbal which rotatably supports the element about a first axis and a second gimbal which rotatably supports the first gimbal about a second axis which is perpendicular to the first axis and a third gimbal which is rotatably attached to the second gimbal about a third axis perpendicular to the first axis; with the third gimbal rotatably mounted to the vehicle about a fourth axis which is initially aligned with the second axis wherein the vehicle's roll axis is coincident with the fourth axis and wherein the vehicle's pitch axis is normally coincident with the third axis. A first pickoff means is connected between the stable platform and the first gimbal to detect the angle between them. A second pickoff means is provided between the first and second gimbals to measure the angle between the first and second gimbals. A first torquing means is connected between the vehicle and the third gimbal to rotate the third gimbal about the fourth axis. A servo means is connected to and is responsive to the second pickoff means to maintain the first, second and third axis substantially orthogonal. A pair of third pickoff means are connected between the second and third gimbals to measure the angle between the second and third gimbals. A fourth pickoff means is connected between the third gimbal and the vehicle to detect the angle between them. A first switching means responsive to the first pickoff of the pair of third pickoff means are provided for reversing the output signals from all of the pickoffs except the second pickoff and the first pickoff of the pair of the third pickoffs when the angle between the second and third gimbals crosses ±90 degrees from the original erection position.

A second servo means is provided which is responsive to the fourth pickoff for maintaining the third gimbal in the initial erection position with respect to the vehicle.

Logic means are provided to connect the second servo means to the first torquer and to disconnect the first servo means when the dynamic limitations of the first torquer are reached. A second switching means responsive to the ±90 degrees crossing of the fourth pickoff means from the initial erection position changes the polarity of the output of the second servo means.

It is therefore an object of the present invention to provide a novel mechanization for electronically flipping a third gimbal of a stabilized platform.

It is another object of the present invention to provide a mechanization for limiting the dynamic demands made upon the torquing means of a three-gimbal four axis stabilized platform.

It is a further object of the present invention to provide a mechanization which allows a three gimbal stabilized platform to be used in vehicles which are capable of high rates of pitch.

It is still another object of the present invention to provide a mechanization wherein mechanical gimbal flipping is minimized.

DESCRIPTION OF THE PREFERRED EMBODIMENT OF THE INVENTION

Figure 1:
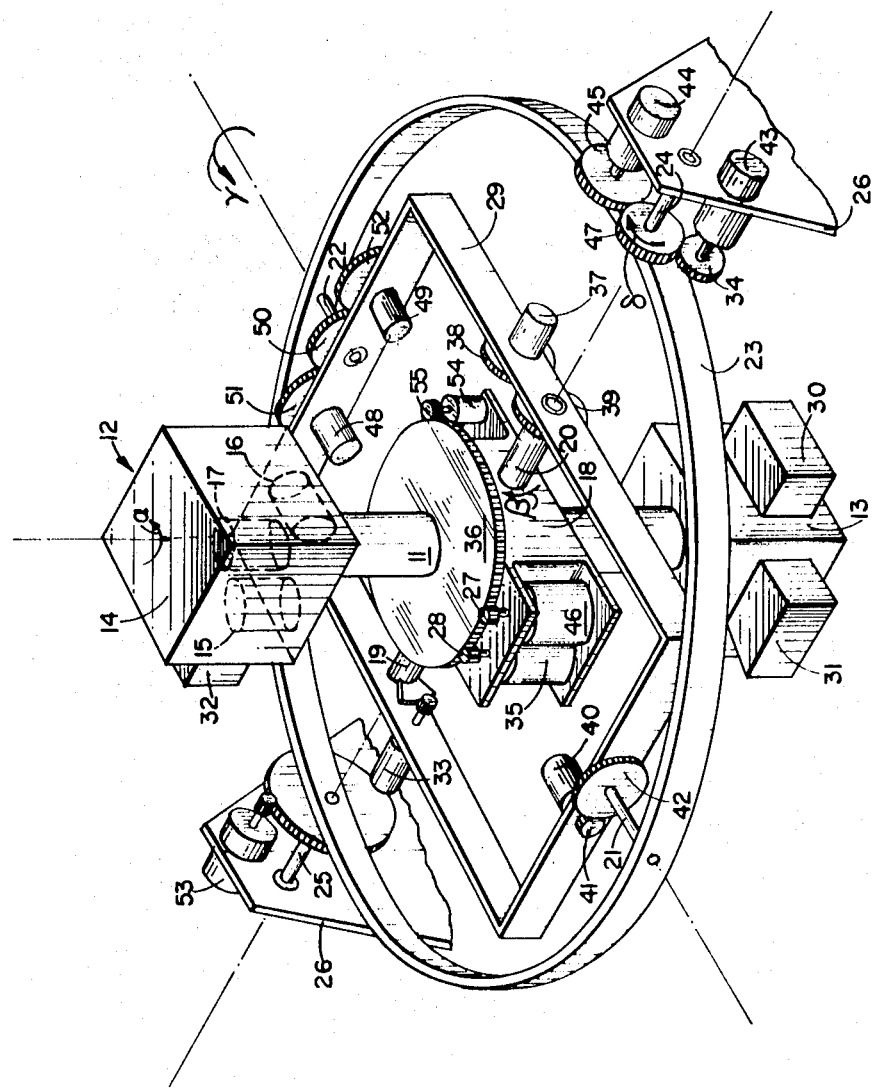
FIG. 1 is a isometric view illustrating a gyroscope stabilized platform used in the preferred embodiment of the invention.

Referring to FIG. 1, a gyroscope stabilized platform 12 is shown as a dumbbell-shaped structure comprising a shaft 11 joining structure 14 at one end to structure 13 at the other end. The stable platform 12 in this invention is intended to remain stabilized in space about all axes. Structure 14 supports a set of three single axes gyroscopes 15, 16 and 17 with orthogonal input axes and an accelerometer 32. Structure 13 carries a pair of accelerometers 30 and 31. The accelerometers are positioned to detect accelerations along three mutually orthogonal axes which may be designated X, Y and Z. Shaft 11 is supported for rotation in a gimbal 18, having transverse coaxial shafts 19 and 20 mounted for rotation about a cross-axis in a second gimbal member 29. Gimbal 29 has coaxial shafts 21 and 22, mounted for rotation in an outer (3rd gimbal ring) 23. Gimbal 23 is connected by coaxial shafts 24 and 25 to a vehicle frame 26 for rotation relative to the vehicle's roll axis. A synchro 46 is connected to be turned when shaft 11 turns by the meshing of a gear 27 with gear 36, which is in turn affixed to shaft 11. A torquer 35 is connected to generate a torque by the intermeshing of gear 28 with gear 36.

The stable platform 12 in a typical arrangement will be maintained vertical and in some predetermined azimuth orientation, e.g., NSEW, with the aid of the accelerometers and other controls, not in themselves a part of this invention.

Accordingly, the axis of rotation of shaft 11 may be called the azimuth axis with the rotation angle around the axis being designated α. The axis of rotation of coaxial shafts 19 and 20 is called the inner-roll axis and rotations about the axis will be designated β. The azimuth axis is perpendicular to the inner-roll axis. The axis of rotation of coaxial shafts 21 and 22 is called the pitch axis, and rotations about the axis are designated γ. The axis of rotation of coaxial shafts 24 and 25 is called the outer roll axis and the angular rotation about that axis is designated as the δ angle. Torquer 37 is connected to gimbal 29 to generate a torque between shaft 20 and gimbal 29 by means of gears 38 and 39. Torquer 40 is connected to gimbal 29 to generate a torque between gimbals 29 and 23 about the axis of shafts 21 and 22 by means of gears 41 and 42. A position pickoff 33 is connected to gimbal 29 to detect the angular rotation of shafts 19 and 20 with respect to gimbal 29. Torquer 44 and tachometer 43 are connected to a vehicle support 26 to generate a torque and to sense rate respectively between the vehicle support and shaft 24 by means of gears 34, 45 and 47. Position synchros 46, 49 and 53 are gear-coupled to members 11, 29 and 23 respectively to provide attitude and heading information. An additional synchro 48 is coupled via gear 51 and 50 to sense the rotation of gimbal 29 about shaft 22. A transformation resolver 54 is driven via gear 55 by gear 36. The function of resolver 54 is described in the discussion of FIG. 4.

Figure 2:
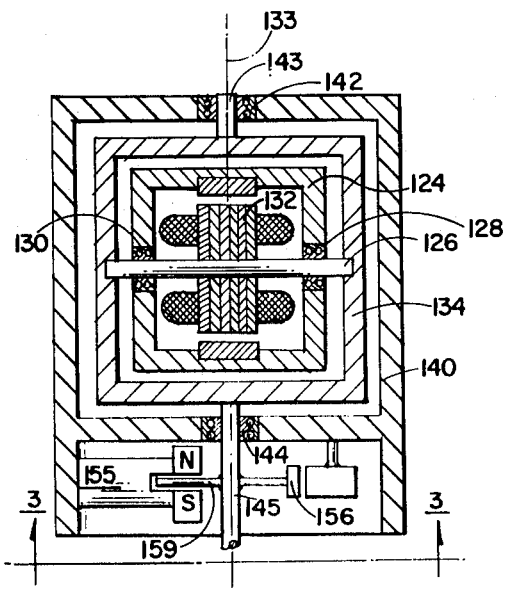
FIG. 2 is a view, partially in section, of a typical gyroscope utilized in the inertial platform of FIG. 1.
Figure 3:
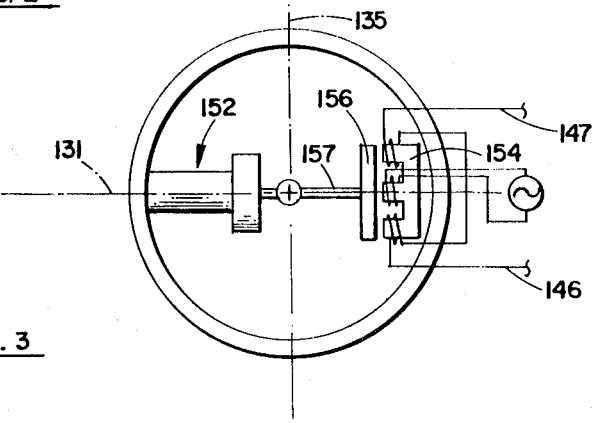
FIG. 3 is a view taken along the line 3—3 of FIG. 2.

Referring to FIGS. 2 and 3 which show in a central vertical section and in elevation, the element of a typical gyroscope suitable for use in connection with the invention for stabilizing the inertial platform 12. A rotor 124 of substantial moment of inertia is supported on ball bearings 128 and 130 for spinning at a high speed by electric motor 132. The bearing of shaft 126 is affixed to a gimbal member 134, which is pivoted to a housing 140 by shafts 143 and 145 and bearings 142 and 144. Bearings 142 and 144 are of the minimum friction type. In standard nomenclature for the types of gyroscopes shown, the normal undeflected direction of the rotor spin axis is turned the "spin reference" axis which is shown as axis 131 in FIG. 3. The gimbal axis which is at right angles to axis 131 is designated the "output axis" 133 as shown in FIG. 2. Axis 135, the input axis, is perpendicular to axes 131 and 133 as shown in FIG. 3. An angle pickoff is proved at output axis 133 which may be of the variable transformer type. The angle pickoff includes an iron shoe 156, carried on an arm 157 and opposed to a 3-pole iron member 154 with a coil on the middle pole excited by a constant AC signal source. Oppositely wound coils are positioned on the outer poles. On displacement of the shoe, an alternating current of phase and amplitude, depending on the displacement, appears at the output of terminals 147 and 149.

It is customary also to supply means for applying a torque to the gyroscope about its output axis; and, torquer 152 is supplied which has a coil 159 extending into the gap of a permanent magnet 155. On energization of coil 159 with direct current, a proportional moment is applied about the gyroscope output axis 133. Torquer 152 permits the application of a controlled torque to the gyroscope from the accelerometers or other sources.

Figure 4:
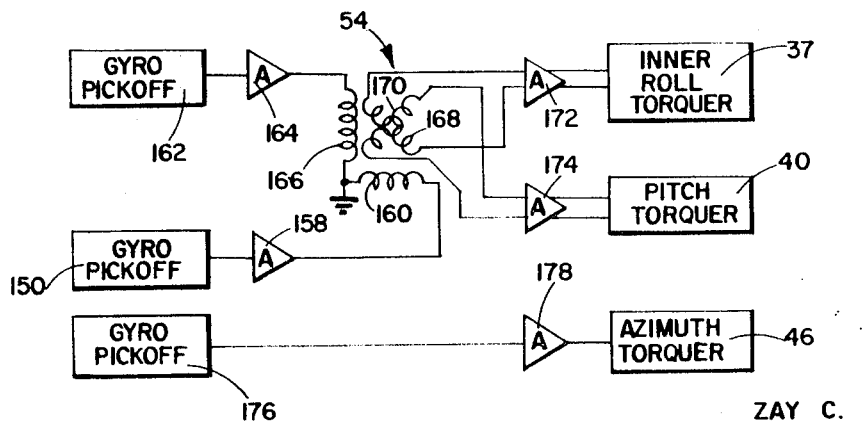
FIG. 4 is a block diagram of an electrical portion of the gyroscope stabilized platform of FIG. 1.

In FIG. 4 there is shown a diagram of the electrical portion of the stabilized platform of FIG. 1. Gyro pickoff 150 of gyroscope 16 is connected through amplifier 158 to coil 160 of azimuth axis transformation resolver 54. Gyro pickoff 162 of gyroscope 17 is connected through amplifier 164 to coil 166 of azimuth axis transformation resolver 54. Coil 168 is connected in quadrature with coil 170. Coils 168 and 170 are rotatable. The electrical output of coil 168 is connected through amplifier 172 to drive the inner roll torquer 37. The electrical output of coil 170 is connected through amplifier 174 to drive the pitch torquer 40. Gyro pickoff 176 of gyroscope 18 is connected through amplifier 178 to drive the azimuth torquer 35. Any stray torque on platform 12 which otherwise would cause the platform to drift is thus sensed by gyroscopes 15, 16 and 17 and an opposing torque is applied from the servo system.

Figure 5A:
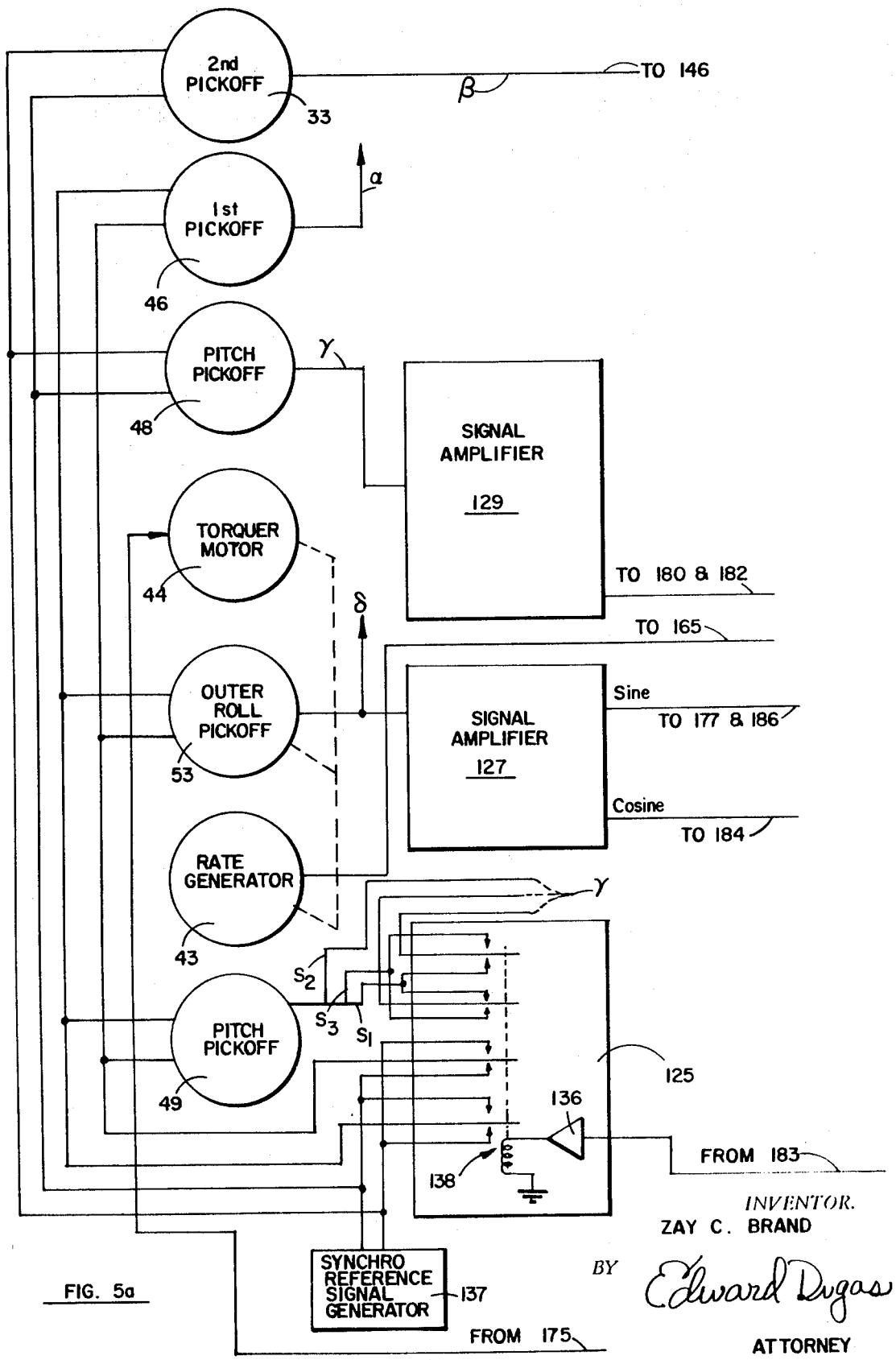
FIGS. 5a, b, and c is a block diagram of another electrical portion of the gyroscope stabilized platform of FIG. 1.
Figure 6:
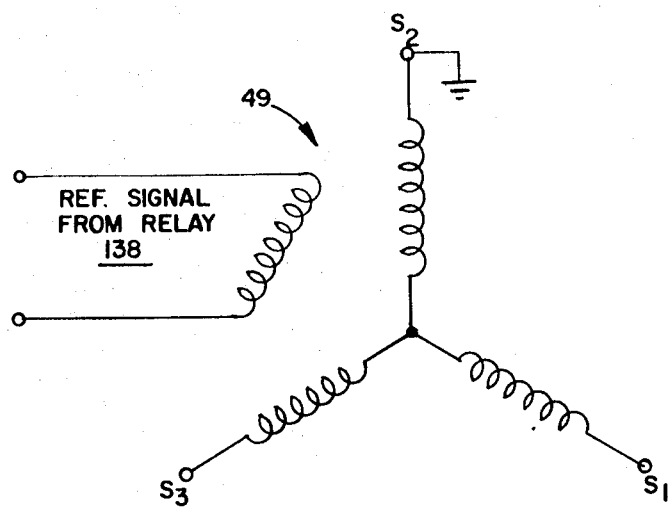
FIG. 6 illustrates in electrical schematic form a synchro which may be used with the invention.

Referring now to FIGS. 5a, b and c, the output from the inner roll pickoff 33 which is a function of the angle β is fed to a first servo means 139. The output from the first servo means 139 is fed to the outer roll torquer motor 44 to complete a servomechanism loop. The output of inner roll pickoff 33 is received by an AC amplifier 146 whose output is connected to an amplifier 148, through a switch 153, which switch determines the polarity of the output of amplifier 148 as a function of the pitch angle from the synchro 48. The output of amplifier 146 is also fed to rectifier 154 to provide a DC signal, the level of which is proportional to the magnitude of $\beta$. The output from amplifier 148 is fed to a standard servo demodulator and compensator 151 which also receives a reference signal to enable the received signal to be demodulated. The output of demodulator/compensator 151 is fed to a DC amplifier 163 via a switch 167 which is normally closed when the system is in a follow-up enable mode; which is the normal mode of operation of the stable platform described in the aforementioned U.S. Pat. No. 3,029,646. The output from amplifier 163 is fed via switch 171 to a summation amplifier 165. The output of the tachometer (rate generator) 43 is also summed into amplifier 165. During the initial erection of the inertial platform an outer roll erection signal is fed via switch 173 into the summation amplifier 165 and switch 171 is open. The output of amplifier 165 is fed into a power amplifier 175. The power amplifier 175 provides the driving power necessary to energize the torquer motor 44. The output from rectifier 154 is sent to a first level detector 159 and to a second level detector 161. In the design of the preferred embodiment, level detector 159 provides an output signal when the inner roll angle is greater than |5.0| degrees and level detector 161 provides an output when the inner roll angle is greater than |0.5| degrees. The output from level detector 159 is fed into the AND gate 193 as one of its inputs. The output from level detector 161 is fed back to the DC amplifier 163 and the demodulator/compensator 151 in order to change the gain and compensation of the first servo means when the inner roll angle is greater than |0.5| degrees. This particular feature provides additional response capability to the torquer motor during critical maneuvers. The output from synchro 48 is fed to a signal amplifier 129 which amplifier may be of the standard Scott T type, and from there to a rectifier 180 and demodulator 182. The output from rectifier 180 is connected to a level detector 181 to provide an output signal which is a function of the magnitude of $\gamma$. The $\gamma$ discrete signal from level detector 181 is then fed to gate 193. Demodulator 182 also receives a reference signal to demodulate the received signal from amplifier 129. The output of demodulator 182 is fed to a Zero crossover detector 183 which provides a change in output when the absolute value of the $\gamma$ angle is substantially 90 degrees and maintains this output state from 90° to 270°. This output is fed to amplifier 136 in the phase shifter and switch module 125. The output of amplifier 136 activates a relay 138 to change the phase of the excitation signal applied to synchros 49, 46 and 53 and to interchange the S1 and S3 output windings of synchro 49. FIG. 6 shows the standard winding designation of synchro 49. The excitation signal is received from a signal source 137. Therefore, as the pitch axis of the platform passes through the 90 degree mark, there would be an electrical sign reversal occurring at the outputs of pickoffs 49, 46 and 53 which would have otherwise been accomplished by the mechanical gimbal flip.

The output of Zero crossover detector 183 is also fed to switch 153 to reverse the output polarity of amplifier 148 and thereby reverses the output of the first servo means 139. The output from synchro 53 which is the signal $\delta$ is fed to an amplifier 127, which amplifier may be a Scott-T to provide a sine and cosine signal with the sine signal being fed to a rectifier 177 and to a polarity selector 186. The cosine signal is fed to a demodulator 184 which also receives as an input a reference signal required with the output of demodulator 184 being fed to a Zero crossover detector 185. Zero-crossover detector 185 provides an output signal indicative of the polarity change when the $\delta$ angle is substantially 90 degrees and maintains that state from 90° to 270° and this output is fed to polarity selector 186 to activate and switch the sine signal received from amplifier 127 between the plus and minus terminals of amplifier 187 and thereby reverse the output of the second servo means. The output of amplifier 187 is fed to a demodulator and compensation circuit 188 to provide a servo signal which is a function of $\delta$. This signal is fed through switch 169 to the input of amplifier 163 and through switch 173 to the input of amplifier 165. The level detector 179 receives the output signal from rectifier 177, and the output of level detector 179 changes state as a function of the magnitude of $\delta$, and is fed to the input of OR gate 191. The output of OR gate 191 is fed to the input of OR gate 190 with the output of the OR gate 190 being fed as one of the inputs to OR gate 191. The output of gate 193 is fed to inverting gate 192, with the output of gate 192 being reversed in sign and being fed to OR gate 190 as one of its inputs. The output of gate 190 also activates switch 167 and is also fed to an inverting amplifier 189, the output of which activates the switch 169. Switch 167 is always in the opposite state to switch 169. When the logic output from gate 190 is true, switch 167 will open and switch 169 will close. This will transfer servo control of the outer roll gimbal 23 from the $\beta$ servo signal to the $\delta$ servo signal which in effect cages gimbal 23 to the vehicle frame reference 26. The logic of control transfer is more readily illustrated by FIG. 7.

Figure 7:
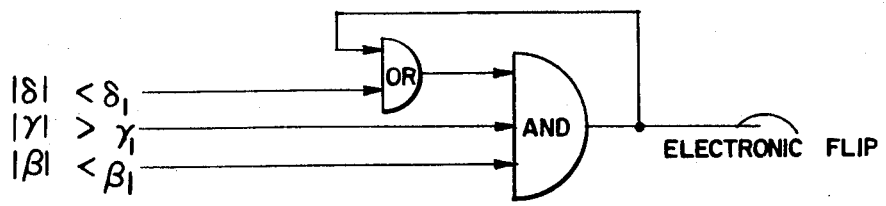
FIG. 7 illustrates a logic block diagram useful in understanding the operation of the invention.
Figure 8:
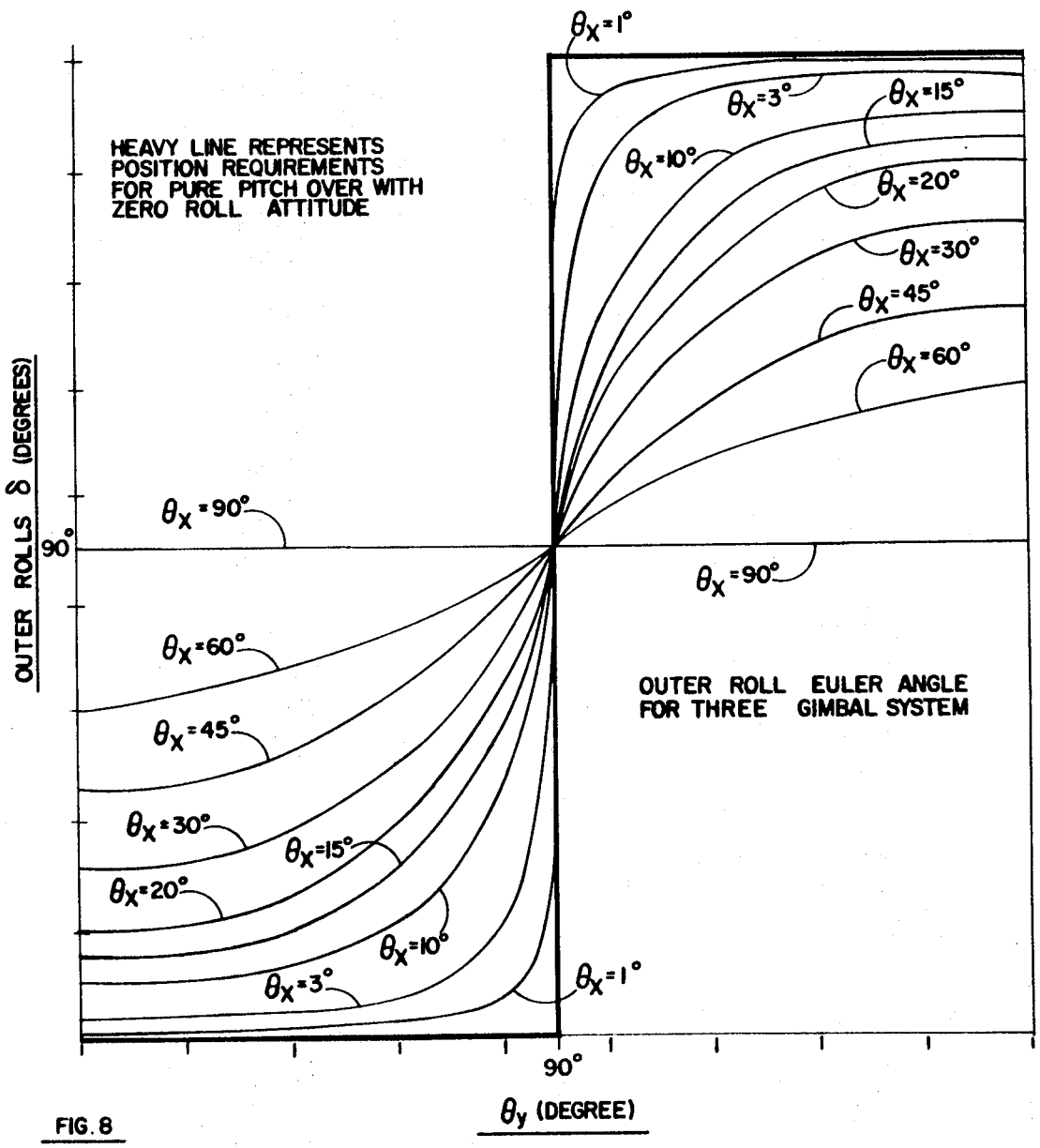
FIG. 8 is a chart useful in understanding the operation of the preferred embodiment of the invention.

In summeray, using the equations of motion for a three gimbal four axis system, a family of curves can be generated depicting the outer roll gimbal position requirements as a function of vehicle initial roll attitude ($\theta_x$) (at the start of the pitch over; FIG. 8) and vehicle pitch attitude $\theta_y$ inspection of these curves shows that for small or zero initial roll attitude, ($\theta_x$), the outer roll gimbal euler angle $\delta$ changes rapidly for small changes in vehicle pitch attitude ($\theta_y$) when the vehicle is at or near a zenith or nadir attitude (i.e. $\theta_x=0$, $\theta_y=90°$, $\delta$ changes 180°). The time allowed to flip becomes a function of $\theta^x$, $\theta^y$ and $\dot\theta^y$. The Transfer Zone mechanization avoids this trouble zone (near zenith or nadir vehicle attitude). The Transfer Zone is defined relative to the gimbal angles, about | pitch euler angle $|=|\gamma|=90$ degrees within which the control of the outer roll gimbal is transferred from the inner roll euler angle ($\beta$) to the outer roll euler angle $\delta$. This is referred to as an outer roll cage. The logic defining the Transfer Zone is shown in FIG. 7. The choice of $\delta_1$, $\gamma_1$, and $\beta_1$, are based upon the dynamic capability of the outer roll control loop, the pitching rate requirements, vehicle yaw rate capability at or near the zenith or nadir attitude and the amount of inner roll freedom of the design. Generally $\beta_1$, shall be half its mechanical freedom. For the system actually designed, $\gamma_1$ was 82 and $\delta_1$ was 22.5°. The normal outer roll or follow-up servo will insure that $\beta$ will be nearly zero prior to entry into the Transfer Zone. Thus, the conditions which define entrance into the Transfer Zone are:

$$|\delta|<\delta_1$$
$$|\gamma|>\gamma_1$$

Once in the Transfer Zone, $\delta$ is no longer a part of the decision process. This is necessary to preclude exit from the Transfer Zone due to an overshoot of logic caused by the momentum of the outer roll gimbal. While in the Transfer Zone, the $\beta$ angle senses vehicle yaw motion. In that the vehicle can depart from the zenith or nadir attitudes, by any combination of a vehicle yaw or pitch maneuver, both $\beta$ and $\gamma$ are the only requirements necessary to depart from the Transfer Zone, That is:

$$|\gamma|<\gamma_1$$
$$|\beta|>\beta_1$$

While in the Transfer Zone, an electronic sign changer as a function of the pitch euler angle $\gamma$ is employed which changes state as $\gamma$ passes through 90 degrees. This is a mechanization previously discussed and is used to generate a 180 degree reversal in the normal outer roll control loop. To provide proper attitude information, electronic reversal of attitude transducers are required as a function of the state of the electronic sign changer. Also because the $\gamma$ sign changer creates electronic flipping, it is necessary to employ a second electronic sign changer which changes state as δ passes through |90 degrees|. This comes about in that a vehicle could make a pure 180 degree pitch maneuver from level, then roll 180 degrees to attain a level attitude, and heading in the reverse direction. If the next maneuver brings the system into the Transfer Zone, the requirement to cage would be a 180 degree flip unless the δ sign changer is employed to provide caging demand to the nearest null.

The advantages of this mechanization over the standard follow-up control mechanization is that of having a system which is capable of withstanding higher vehicle maneuvering rates. It does not have infinite capability in that it only moves the problem area to lesser demanding dynamic points. If only the γ sign changer were employed, there would be an advantage over the conventional control loop, but the problem area would be on the edge of a very tight cone centered about the zenith or nadir attitudes. The Tranfer Zone mechanization may be thought of as having an enlarged conical zone centered about the zenith or nadir attitude. The problem area is moved to the edge of the Transfer Zone. The shape of the Transfer Zone $[F(\gamma_1, \beta_1)]$ is selcted by weighing the various vehicle maneuvering rates, achievable outer roll gimbal control loop dynamics, and the amount of inner roll freedom available. A logical extension of the Transfer Zone mechanization is a Dead Zone mechanization. This mechanization requires the same euler angle logic to establish a zone and the electronic flip, but in lieu of caging the outer roll gimbal to the vehicle frame, the control of this gimbal is opened or dead in the zone established about $|\gamma|=90°$. This can be accomplished by deleting switch 169, demodulator 188, amplifier 187, polarity switch 186, Zero crossover detector 185, and demodulator 184. While in the Dead Zone, the α axis is torqued against the vehicle frame only in so much as the friction of the outer roll permits. This is possibly because the friction of the outer most gimbal is generally much greater than that of the inner axes. Yaw motions of the vehicle which do not drag the outer roll gimbal along could result in a large β angle which would temporarily cause the system to leave the Dead Zone operation. Control on β can be achieved by driving the outer roll gimbal until the entrance into Dead Zone requirements are once again met. This Dead Zone operation has some disadvantage of performance over the Transfer Zone mechanization in that when leaving the Dead Zone the amount of follow-up correction required may be greater than that required for the Transfer Zone mechanization.

I claim:

1. Means for supporting an inertial element in a vehicle for universal freedom of rotation relative to said vehicle comprising:
    a first gimbal attached to said element for freedom of rotation about a first axis;
    a second gimbal attached to said first gimbal for rotation about a second axis perpendicular to said first axis;
    a third gimbal connected to said second gimbal for rotation about a third axis perpendicular to said second axis;
    means for supporting said third gimbal relative to said vehicle with freedom of rotation about a fourth axis which has a fixed orientation relative to said vehicle and which is perpendicular to said third axis;
    pickoff means for detecting misalignment of said second gimbal relative to said inertial element about said second axis;
    torquing means connected between said vehicle and said third gimbal about said fourth axis;
    servo means connected between said pickoff means and said torquing means, said servo means including a resolver connected between said second and third gimbals;
    a second pickoff means connected between said vehicle and third gimbal for detecting misalignment of said third gimbal relative to said vehicle;
    second servo means responsive to said second pickoff means;
    switching means for connecting said second servo means to said torquing means and for disconnecting said first servo means from said torquing means when the dynamic limitations of said torquing means are reached; and
    means for electronically reversing the output signal from said servo means when the angle between said second and third gimbals is substantially |90°| from an initial erection position.

2. The invention according to claim 1 and further comprising:
    means for reversing the output of said second servo means when the angle between said second and third gimbals is substantially |90°| from an initial erection position.

3. Means for supporting an inertial element in a vehicle for universal freedom of rotation relative to said vehicle comprising:
    a first gimbal attached to said element for freedom of rotation about a first axis;
    a second gimbal attached to said first gimbal for rotation about a second axis perpendicular to said first axis;
    a third gimbal connected to said second gimbal for rotation about a third axis perpendicular to said second axis;
    means for supporting said third gimbal relative to said vehicle with freedom of rotation about a fourth axis which has a fixed orientation relative to said vehicle and which is perpendicular to said third axis;
    pickoff means for detecting misalignment of said second gimbal relative to said inertial element about said second axis;
    torquing means connected between said vehicle and said third gimbal about said fourth axis;
    servo means connected between said pickoff means and said torquing means; said servo means including a resolver connected between said second and third gimbals; and
    means for electronically reversing the output signal from said servo means when the angle between said second and third gimbals is substantially |90°| from an initial erection position.

4. A vehicle mounted stabilized element comprising in combination:
    an inertially stabilized element;
    a first gimbal rotatably supporting said inertial element about a first axis;
    a second gimbal rotatably supporting said first gimbal about a second axis which is perpendicular to the first axis;
    a third gimbal rotatably attached to said second gimbal about a third axis perpendicular to said first axis; with said third gimbal rotatably mounted to said vehicle about a fourth axis which is initially aligned with the second axis;
    a first pickoff means connected between the stable element and the first gimbal to measure the angle between them;
    a second pickoff means connected between said first and second gimbals to measure the angle between them;
    a first torquing means connected between the vehicle and the third gimbal to rotate the third gimbal about the fourth axis;
    a first servo means responsive to the second pickoff means to maintain the first, second and third axis substantially orthogonal;
    a third pickoff means connected between the second and third gimbals to measure the angle between them;
    a fourth pickoff means connected between the third gimbal and the vehicle to measure the angle between them;

a first switching means responsive to the third pickoff means for reversing the output signals from all of said pickoffs except said second pickoff when the angle between the second and third gimbal crosses ±90° from the original erection position;

a second servo means responsive to said fourth pickoff for maintaining the third gimbal in the initial erection position with respect to the vehicle;

logic means for connecting said second servo means to said first torquer and for disconnecting said first servo means from said first torquer when the dynamic limitations of said first torquer are reached; and a second switching means responsive to the ±90° crossing of said fourth pickoff means from the initial erection position for changing the polarity of the output of said second servo means.

5. The invention according to claim 4 and further comprising:

a rate detecting means for detecting the rate of rotation of said third gimbal about said vehicle frame and for providing a signal to said first servo means indicative of said rate to facilitate servo control of said third gimbal.

6. The invention according to claim 4 wherein said logic means connects said second servo means and disconnects said first servo means when $$|\delta|<\delta_1$$
$$|\gamma|>\gamma_1$$
$$|\beta|>\beta_1$$

wherein $\beta_1$ is substantially equal to half of the angular freedom of said second pickoff; and $\delta_1$ is approximately 22.5°, and $\gamma_1$ is approximately 82°.

7. A vehicle mounted stabilized element comprising in combination:

(a) an inertially stabilized element;
(b) a first gimbal rotatably supporting said inertial element about a first axis;
(c) a second gimbal rotatably attached to said first gimbal about a second axis, perpendicular to said first axis;
(d) a third gimbal rotatably attached to said second gimbal about a third axis perpendicular to first axis;
(e) means for supporting said third gimbal about a fourth axis perpendicular to said third axis;
(f) first pickoff means connected between said first gimbal and said inertial element to measure the angle between said first gimbal and said inertial element;
(g) second pickoff means connected between said first and said second gimbal to measure the angle between said first and second gimbals;
(h) a pair of third pickoff means connected between said second and third gimbals to measure the angle between said second and third gimbals;
(i) fourth pickoff means connected between said third gimbal and the frame of said vehicle to measure the angle between said third gimbal and said vehicle;
(j) first torquing means connected between said third gimbal and the frame of said vehicle for rotating said third gimbal about said fourth axis;
(k) first servo means connected between said second pickoff and said first torquing means to maintain said first, second and third axis substantially orthogonal;
(l) reversing means for reversing the output signals from all of said pickoffs except for the output signals from said first pickoff and said first pickoff of said pair of third pickoffs;
(m) first switching means responsive to the output signal from said first pickoff of said pair of third pickoffs connected to said reversing means for reversing said output signals when the angle between said second and third gimbals is substantially ±90 degrees from its original erection position to maintain said polarity from 0°±90° and from 180°±90°.
(n) rate detecting means connected to detect the rate of angular rotation of said third gimbal with respect to said vehicle, the output of said rate detecting means fed to an input of said first servo means to facilitate control of said third gimbal;
(o) second servo means responsive to said fourth pickoff for maintaining said third gimbal in an initial erection position.
(p) means for connecting said first torquer to said first or said second servo means in response to the attitude of said inertial element as a function of the dynamic limitations of said first torquer;
(q) switching means for reversing the output polarity of said second servo means when the angle between the second and third gimbal crosses ±90° from the original erection position.

References Cited
UNITED STATES PATENTS

| | | | |
|---|---|---|---|
| 2,949,785 | 8/1960 | Singleton et al. | 74—5.34 |
| 3,029,646 | 4/1962 | Slater et al. | 74—5.2 X |
| 3,188,870 | 6/1965 | Lerman | 74—5.2 |
| 3,238,795 | 3/1966 | Greenberg et al. | 74—5.34 X |
| 3,383,926 | 5/1968 | Weber | 74—5.2 X |
| 3,509,777 | 5/1970 | Pfuntner | 74—5.2 |

MANUEL A. ANTONAKAS, Primary Examiner

U.S. Cl. X.R.

73—504; 74—5.34